| United States Patent [19] | [11] Patent Number: 5,043,468 |
| Maurer et al. | [45] Date of Patent: Aug. 27, 1991 |

[54] PROCESS FOR DELAYING THE GELLING OF UNSATURATED MONOMERS, DELAYED-GELLING COMPOSITIONS CONTAINING THE MONOMERS AND APPLICATION OF THE COMPOSITIONS TO THE TREATMENT OF SUBTERRANEAN FORMATIONS

[75] Inventors: Robert Maurer, Saint Cyr/Au/Mont D'Or; Michel Landry, Fontaine/Sur/Saone, both of France

[73] Assignee: Rhone-Poulenc Chimie, Courbevoie, France

[21] Appl. No.: 440,799

[22] Filed: Nov. 24, 1989

[30] Foreign Application Priority Data

Nov. 25, 1988 [FR] France ................................ 88 15395

[51] Int. Cl.$^5$ ............................ C09K 7/00; C08F 2/00
[52] U.S. Cl. ........................................... 560/4; 526/62;
252/8.51; 252/8.511; 252/8.512; 252/8.551;
166/285; 562/598; 564/4
[58] Field of Search ................. 252/8.51, 8.511, 8.512,
252/8.551; 560/4; 166/285; 526/62

[56] References Cited

U.S. PATENT DOCUMENTS

| 2,758,131 | 8/1956 | Couvillon . |
| 2,773,874 | 12/1956 | Hudson et al. . |
| 4,140,606 | 2/1979 | Sakimoto et al. .................... 204/159 |
| 4,190,109 | 2/1980 | Barton, Jr. ............................ 166/270 |
| 4,190,717 | 2/1980 | Suzuki et al. ......................... 526/62 |
| 4,638,079 | 1/1987 | Inskip et al. ........................... 560/4 |
| 4,644,020 | 2/1987 | Stahl ................................. 522/79 X |
| 4,663,480 | 5/1987 | Inskip et al. ......................... 562/598 |
| 4,687,586 | 8/1987 | Argabright et al. ............. 252/8.551 |

Primary Examiner—Robert L. Stoll
Assistant Examiner—Chhaya Sayala
Attorney, Agent, or Firm—Finnegan, Henderson, Farabow, Garrett, and Dunner

[57] ABSTRACT

The present invention relates to a process and compositions for delaying the gelling of vinyl monomers in an aqueous medium in the presence of a polymerization initiator, by employing a polymerization inhibitor consisting of an N-nitrosophenylamine salt in combination with an aminocarboxylic acid. The composition is used for plugging circulation losses when drilling at great depth.

14 Claims, No Drawings

PROCESS FOR DELAYING THE GELLING OF UNSATURATED MONOMERS, DELAYED-GELLING COMPOSITIONS CONTAINING THE MONOMERS AND APPLICATION OF THE COMPOSITIONS TO THE TREATMENT OF SUBTERRANEAN FORMATIONS

BACKGROUND OF THE INVENTION

During drilling operations in oil or gas deposits, crossing permeable or fractured regions can cause a partial or even total loss of drilling mud.

For reasons of economy (cost of drilling mud) and of safety (stability of the work), it is absolutely necessary to carry out prompt plugging of the circulation losses. It is known in the art to resort to grouts of hydrosoluble monomers (for example, acrylamide, methylolacrylamide, and other acrylic and methacrylic derivatives) which, when suitably formulated (such as by addition of catalysts, weighting materials, viscosity modifiers, and/or retardants), polymerize to a (hydro)gel of three-dimensional structure which is insoluble in water but is capable of swelling when in contact with water.

These grouts are satisfactorily employed for drilling operations at depths at which the temperature is from 0° to 60° C.; however, the use of these grouts at greater depths generally does not work for more than 10 hours because the temperature rise, which is a function of the depth, causes a substantial shortening of the setting time.

It is also known in the art to stabilize vinyl monomers using N-nitrosophenylhydroxylamine salts as taught in U.S. Pat. Nos. 2,758,131 and 2,773,874, and German patent No. 1,239,679. However, such inhibitors are not sufficiently effective at elevated temperatures, especially above 80° C.

SUMMARY OF THE INVENTION

The present invention relates to a process for delaying the conversion of unsaturated monomers into hydrogels, to a delayed-gelling composition containing such monomers and to the application of the composition to the treatment of subterranean formations, especially to the plugging of circulation losses in oil drilling operations, particularly at elevated temperature.

Applicants have discovered a process which makes it possible to delay the gelling of unsaturated monomers which are capable or forming hydrogels in an aqueous medium, while in the presence of a polymerization initiator. The process wherein the polymerization initiator present in the medium is a water-soluble or water-dispersible organic peroxide, whose half-life is at least 10 hours at 60° C. A polymerization inhibitor is also introduced into the medium and consists of an alkali metal or ammonium salt of N-nitrosophenyl-hydroxylamine or one of its derivatives of formula I:

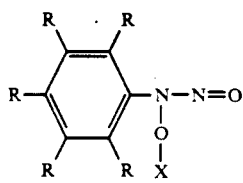

wherein at least two of the radicals R denote hydrogen, the other radicals R being similar or different and denoting methyl, methoxy, ethoxy, nitro, amino, hydroxyl or chloro groups, and X is an ammonium group or an alkali metal. The salt is used in combination with an aminocarboxylic acid in acidic or basic form.

The unsaturated monomers employed are those capable of forming a hydrogel by polymerization in an aqueous medium. Such unsaturated monomers are preferably acrylic monomers such as water-soluble or water-dispersible acrylic monomers of the acrylic or methacrylic acid type, acrylamide, N-alkylacrylamides containing a $C_1$–$C_4$ alkyl radical, methylolacrylamide, methylolmethacryl-amide, $C_1$–$C_4$ alkyl acrylates, inorganic (meth)acrylates, and the like. If necessary, the unsaturated monomers are mixed with at least one water-soluble or dispersible, ethylenically di- or polyunsaturated crosslinking monomer of the type such as methylenetriacrylamide, methylenebismethacrylamide, 1,2-dihydroxyethylenebisacrylamide, 1,2-dihydroxyethylenebismethacrylamide, N-methylol 1,2-dihydroxethylenebisacrylamide, 1,3-bis(acrylamidomethyl)-1,2-imidazolidone, 1,3-bis(methacryl-amidomethyl)-2-imidazolidone and allyl methacrylate.

Preferable organic peroxide polymerization initiators are tert-butyl, tert-amyl and cumene hydroperoxide, and the like.

The salts capable of forming the polymerization inhibitor may be an ammonium salt of N-nitrosophenylhydroxylamine, commonly called "cupferron", or ammonium salts of N-nitroso-4-methylphenylhydroxylamine, N-nitroso-2,6-dinitrophenylhydroxylamine, N-nitroso-2-hydroxy-4-chlorophenylhydroxylamine, N-nitroso-2,6-dinitro-4-chlorophenylhydroxylamine, N-nitroso-2-methoxy-4-aminophenylhydroxylamine, N-nitroso-3-ethoxyphenylhydroxylamine, and the like.

Among the aminocarboxylic acids which can be employed are ethylenediaminotracetic acid (EDTA), diethylenetriaminopentacetic acid (DTPA), nitrilotriacetic acid (NTA), N-(2-hydroxyethyl)ethyl-enediaminotriacetic acid (HEDTA), diaminopropanoltetracetic acid (DPTA), and N,N-di(2-hydroxyethylglycine) (DHEG). The amino-carboxylic acids are in the form of acid or alkali metal salts, in particular sodium salts.

DETAILED DESCRIPTION

The process for delaying the gelling of unsaturated monomers comprises the steps of:

(1) adding a polymerization initiator to an aqueous medium containing unsaturated monomers and (2) introducing into the aqueous medium a polymerization inhibitor, to obtain an aqueous composition which preferably contains:

from 0.2 to 3%, preferably from 0.5 to 2% by weight of polymerization initiator relative to the weight of monomers, from 0.03 to 0.8%, preferably from 0.05 to 0.5% by volume of N-nitrosophenylhydroxylamine salt (or one of its derivatives) relative to the volume of monomers, and from 0.03 to 8%, preferably from 0.05 to 5% by volume of aminocarboxylic acid relative to the volume of monomers.

The ethylenically di- or polyunsaturated crosslinking acrylic monomers may be present in up to approximately 5% of the total weight of the acrylic monomers.

The process of the invention provides that the fluid system, made up of the acrylic monomers in an aqueous medium, the polymerization initiator and the polymerization inhibitor, exhibit a setting time longer than 10 hours at 60° C. and generally longer than 15 hours at 80° C. The setting time is the time interval between the instant when the various constituents of the fluid system are mixed and the instant when the product no longer flows.

The delayed-gelling aqueous compositions of the present invention are based on unsaturated monomers capable of forming a hydrogel, a polymerization initiator and a polymerization inhibitor, and preferably contain:

from 1 to 60 parts by volume, preferably from 10 to 30 parts by volume, of at least one unsaturated monomer capable of forming a hydrogel, from 0.2 to 3% by weight, preferably from 0.5 to 2% by weight, of polymerization initiator relative to the weight of monomer(s), the initiator consisting of a water-soluble or water-dispersible organic peroxide whose half-life is at least 10 hours at 60° C., from 0.03 to 0.8%, preferably from 0.05 to 0.5% by volume of an alkali metal or ammonium salt of N-nitrosophenyl-hydroxylamine or of one of its derivatives of formula I above, relative to the volume of monomer(s), from 0.03 to 8%, preferably from 0.05 to 5%, by volume of an aminocarboxylic acid in acidic or basic form, relative to the weight of monomer(s), and the complement to make up 100 parts by volume of water.

Examples of unsaturated monomers, peroxides, N-nitrosophenyl hydroxylamine salts or their derivatives and aminocarboxylic acids which may form parts of the composition are described above.

These compositions exhibit setting times longer than 10 hours at 60° C. and generally longer than 15 hours at 80° C.

Conventional additives may be incorporated into the compositions, making it possible to adjust density and viscosity to the values required by the depth and the state of the drilling operation, for example, gravity fillers of the barium sulphate type, various reinforcing or extending fillers of the bentonite type, pyrogenic silica type, and various thickeners of the xanthan gum type.

Because of the increased setting time at high temperature, the compositions may be employed for plugging circulation losses at great depths, particularly when crossing highly permeable or fractured regions when drilling for oil or otherwise.

It can be applied equally well in an aquifer medium (fresh water) and in a saline medium (seawater, salt water, saturated salt water).

The following examples are given by way of guidance and are not to be considered as a limit of the scope and spirit of the invention.

EXAMPLES 1 to 44

Preparation of Delayed-Gelling Compositions in Fresh Water 50 cm$^3$ of a mixture comprising the following are homogenized for 5 minutes:

dilution water (tap water)

aqueous solution (tap water) at a concentration of 1% by volume of a commercial aqueous solution containing 70% by volume of tert-butyl or tert-amyl hydroperoxide (TBHP or TAHP); the commercial aqueous solutions containing 70% by volume of TBHP or of TAHP are marketed by the Societe Chalonnaise de Peroxydes Organiques and have densities of the order of 0.94 g/cm$^3$ and 0.9 g/cm$^3$ at 20° C. respectively, an aqueous solution (tap water) containing 1% by volume of cupferron, an aqueous solution (tap water) containing 0.1%, 1% or 10% by volume of EDTA sodium salt or DTPA sodium salt.

Into this mixture are incorporated 50 cm$^3$ of a commercial aqueous solution of Rocagil BT (methylolacrylamide-based solution marketed by Rhone-Poulenc at a concentration of approximately 40% by volume).

The whole is heated to the chosen temperature for measuring the setting time (85° C. or 94° C., depending on the examples).

The setting time is defined as being the period separating the time when the whole is heated to the chosen temperature and the time when the gel has formed.

The quantities of the various components employed and the results obtained appear in Tables I to VII.

Examples 1 to 5 are given by way of comparison.

EXAMPLES 45 to 53

Preparation of Delayed-Gelling Compositions in Seawater.

The operating procedure is the same as Examples 1–44, but the components are:

synthetic seawater containing 34 g/l of salts, as dilution water, solutions of TBHP, of EDTA or DTPA sodium salt and of cupferron in synthetic seawater, and the same solution of Rocagil BT (fresh water)

The quantities of the various components employed and the results obtained appear in Table VIII.

EXAMPLES 54 to 59

Preparation of Delayed-Gelling Compositions in Saturated Salt Water

The operating procedure is the same as Examples 1–44, but the components are:

saturated salt water containing 357 g/l of sodium chloride, as a dilution water, solutions of TBHP and of EDTA sodium salt in saturated salt water, a solution containing 1% by volume of cupferron in tap water, and the same solution of Rocagil BT (fresh water).

The quantities of the various components employed and the results obtained appear in Table IX.

In Tables I to IX ( ) 40% means volume of aqueous solution containing 40% by volume.

( ) 0.1% means volume of aqueous solution containing 0.1% by volume.

( ) 1% means volume of aqueous solution containing 1% by volume.

( ) 10% means volume of aqueous solution containing 10% by volume.

[ ] means volume of active substance in the said solution.

In the case of the TBHP or TAHP initiator:

( ) 1% means volume of aqueous solution containing 1% by volume of commercial aqueous solution containing 70% by volume.

[ ] means volume of commercial aqueous solution containing 70% by volume.

EDTA or EDTA+ means EDTA sodium salt

DTPA or DTPA++ means DTPA sodium salt.

TABLE 1

|  |  | \multicolumn{5}{c}{Examples} |
|---|---|---|---|---|---|---|
|  |  | 1 | 2 | 3 | 4 | 5 |
| BT (cm$^3$) | ( ) 40% | 50 | 50 | 50 | 50 | 50 |
|  | [ ] | 20 | 20 | 20 | 20 | 20 |
| TBHP (cm$^3$) | ( ) 1% | 10 | 10 | 10 | 10 | 10 |
|  | [ ] | 0.1 | 0.1 | 0.1 | 0.1 | 0.1 |
| CUPFERRON (cm$^3$) | ( ) 1% | 1 |  | 0.1 | 0.5 | 0.8 |
|  | [ ] | 0.01 | 0 | 0.001 | 0.005 | 0.008 |
| EDTA (cm$^3$) | ( ) 1% |  | 20 | 0.1 | 0.5 | 0.8 |
|  | [ ] | 0 | 0.2 | 0.001 | 0.005 | 0.008 |
| water (cm$^3$) |  | 39 | 20 | 39.8 | 39 | 38.4 |
| setting time (min) at 85° C. |  | 95 | 40 | 20 | 110 | 180 |

TABLE 2

|  |  | \multicolumn{8}{c}{Examples} |
|---|---|---|---|---|---|---|---|---|---|
|  |  | 6 | 7 | 8 | 9 | 10 | 11 | 12 | 13 |
| BT (cm$^3$) | ( ) 40% | 50 | 50 | 50 | 50 | 50 | 50 | 50 | 50 |
|  | [ ] | 20 | 20 | 20 | 20 | 20 | 20 | 20 | 20 |
| TBHP (cm$^3$) | ( ) 1% | 10 | 10 | 10 | 10 | 10 | 10 | 10 | 10 |
|  | [ ] | 0.1 | 0.1 | 0.1 | 0.1 | 0.1 | 0.1 | 0.1 | 0.1 |
| CUPFERRON (cm$^3$) | ( ) 1% | 2 | 2 | 2 | 2 | 2 | 2 | 2 | 2 |
|  | [ ] | 0.02 | 0.02 | 0.02 | 0.02 | 0.02 | 0.02 | 0.02 | 0.02 |
| EDTA (cm$^3$) | ( ) 1% | 2 | 10 | 20 | 30 |  |  |  |  |
|  | ( ) 10% |  |  |  |  | 4 | 5 | 6 | 10 |
|  | [ ] | 0.02 | 0.1 | 0.2 | 0.3 | 0.4 | 0.5 | 0.6 | 1 |
| water (cm$^3$) |  | 36 | 28 | 18 | 8 | 34 | 33 | 32 | 28 |
| setting time (min) at 85°C. |  | 950 | 1200 | 1290 | 1415 | 1500 | 1655 | 1840 | 2120 |

TABLE 3

|  |  | \multicolumn{7}{c}{Examples} |
|---|---|---|---|---|---|---|---|---|
|  |  | 14 | 15 | 16 | 17 | 18 | 19 | 20 |
| BT (cm$^3$) | ( ) 40% | 50 | 50 | 50 | 50 | 50 | 50 | 50 |
|  | [ ] | 20 | 20 | 20 | 20 | 20 | 20 | 20 |
| TBHP (cm$^3$) | ( ) 1% | 10 | 10 | 10 | 10 | 10 | 10 | 10 |
|  | [ ] | 0.1 | 0.1 | 0.1 | 0.1 | 0.1 | 0.1 | 0.1 |
| CUPFERRON (cm$^3$) | ( ) 1% | 1 | 5 | 9 | 1 | 3 | 5 | 10 |
|  | [ ] | 0.01 | 0.05 | 0.09 | 0.01 | 0.03 | 0.05 | 0.1 |
| EDTA (cm$^3$) | ( ) 0.1% |  | 10 | 10 |  |  |  |  |
|  | ( ) 1% | 1 |  |  | 5 | 5 | 5 | 5 |
|  | [ ] | 0.01 | 0.01 | 0.01 | 0.05 | 0.05 | 0.05 | 0.05 |
| water (cm$^3$) |  | 38 | 25 | 21 | 34 | 32 | 30 | 25 |
| setting time (min) at 85° C. |  | 770 | 1100 | 1130 | 960 | 1220 | 1280 | 1160 |

TABLE 4

|  |  | \multicolumn{7}{c}{Examples} |
|---|---|---|---|---|---|---|---|---|
|  |  | 21 | 22 | 23 | 24 | 25 | 26 | 27 |
| BT (cm$^3$) | ( ) 40% | 50 | 50 | 50 | 50 | 50 | 50 | 50 |
|  | [ ] | 20 | 20 | 20 | 20 | 20 | 20 | 20 |
| TBHP (cm$^3$) | ( ) 1% | 10 | 10 | 10 | 10 | 10 | 10 | 10 |
|  | [ ] | 0.1 | 0.1 | 0.1 | 0.1 | 0.1 | 0.1 | 0.1 |
| CUPFERRON (cm$^3$) | ( ) 1% | 1 | 3 | 5 | 10 | 1 | 3 | 5 |
|  | [ ] | 0.01 | 0.03 | 0.05 | 0.1 | 0.01 | 0.03 | 0.05 |
| EDTA (cm$^3$) | ( ) 1% | 10 | 10 | 10 | 10 |  |  |  |
|  | ( ) 10% |  |  |  |  | 6 | 6 | 6 |
|  | [ ] | 0.1 | 0.1 | 0.1 | 0.1 | 0.6 | 0.6 | 0.6 |
| water (cm$^3$) |  | 29 | 27 | 25 | 20 | 33 | 31 | 29 |
| setting time (min) at 85° C. |  | 785 | 1250 | 1405 | 1120 | 1420 | 1960 | 3600* |

*soft gel

TABLE 5

|  |  | \multicolumn{3}{c}{Examples} |
|---|---|---|---|---|
|  |  | 28 | 29 | 30 |
| BT (cm$^3$) | ( ) 40% | 50 | 50 | 50 |
|  | [ ] | 20 | 20 | 20 |
| TBHP (cm$^3$) | ( ) 1% | 10 | 10 | 30 |
|  | [ ] | 0.1 | 0.1 | 0.3 |
| CUPFERRON (cm$^3$) | ( ) 1% | 2 | 2 | 2 |
|  | [ ] | 0.02 | 0.02 | 0.02 |
| EDTA (cm$^3$) | ( ) 1% | 15 | 20 | 10 |
|  | [ ] | 0.15 | 0.2 | 0.1 |
| water (cm$^3$) |  | 23 | 18 | 8 |
| setting time (min) |  |  |  |  |
| at 85° C. |  |  |  | 600 |
| at 94° C. |  | 620 | 710 |  |

*soft gel

TABLE 6

|  |  | \multicolumn{6}{c}{Examples} |
|---|---|---|---|---|---|---|---|
|  |  | 31 | 32 | 33 | 34 | 35 | 36 |
| BT (cm$^3$) | ( ) 40% | 50 | 50 | 50 | 50 | 50 | 50 |
|  | [ ] | 20 | 20 | 20 | 20 | 20 | 20 |
| TAHP (cm$^3$) | ( ) 1% | 10 | 10 | 10 | 10 | 10 | 10 |

TABLE 6-continued

|  |  | \multicolumn{6}{c}{Examples} |
|---|---|---|---|---|---|---|---|

|  |  | 31 | 32 | 33 | 34 | 35 | 36 |
|---|---|---|---|---|---|---|---|
| CUPFERRON (cm³) | [ ] | 0.1 | 0.1 | 0.1 | 0.1 | 0.1 | 0.1 |
|  | ( ) 1% | 2 | 2 | 2 | 2 | 2 | 2 |
| EDTA (cm³) | [ ] | 0.02 | 0.02 | 0.02 | 0.02 | 0.02 | 0.02 |
|  | ( ) 1% | 5 | 10 | 20 |  |  |  |
|  | ( ) 10% |  |  |  | 4 | 5 | 6 |
|  | [ ] | 0.05 | 0.1 | 0.2 | 0.4 | 0.5 | 0.6 |
| water (cm³) |  | 33 | 28 | 18 | 34 | 33 | 32 |
| setting time (min) at 85° C. |  | 850 | 1030 | 1200 | 1490 | 1520 | 1800 |

TABLE 7

|  |  | 37 | 38 | 39 | 40 | 41 | 42 | 43 | 44 |
|---|---|---|---|---|---|---|---|---|---|
| BT (cm³) | ( ) 40% | 50 | 50 | 50 | 50 | 50 | 50 | 50 | 50 |
|  | [ ] | 20 | 20 | 20 | 20 | 20 | 20 | 20 | 20 |
| TAHP (cm³) | ( ) 1% | 10 | 10 | 10 | 10 | 10 | 10 | 10 | 10 |
|  | [ ] | 0.1 | 0.1 | 0.1 | 0.1 | 0.1 | 0.1 | 0.1 | 0.1 |
| CUPFERRON (cm³) | ( ) 1% | 2 | 2 | 2 | 2 | 2 | 3 | 3 | 3 |
|  | [ ] | 0.02 | 0.02 | 0.02 | 0.02 | 0.02 | 0.03 | 0.03 | 0.03 |
| DTPA (cm³) | ( ) 1% | 5 | 20 | 30 |  |  | 5 | 20 | 30 |
|  | ( ) 10% |  |  |  | 5 | 10 |  |  |  |
|  | [ ] | 0.05 | 0.2 | 0.3 | 0.5 | 1 | 0.05 | 0.2 | 0.3 |
| water (cm³) |  | 33 | 18 | 8 | 33 | 28 | 32 | 17 | 7 |
| setting time at 85° C. |  | 1110 | 1600 | 2300 | 3100 | 5400* | 1100 | 1750 | 2500 |

*very soft gel

TABLE 8

|  |  | 45 | 46 | 47 | 48 | 49 | 50 | 51 | 52 | 53 |
|---|---|---|---|---|---|---|---|---|---|---|
| BT (cm³) | ( ) 40% | 50 | 50 | 50 | 50 | 50 | 50 | 50 | 50 | 50 |
|  | [ ] | 20 | 20 | 20 | 20 | 20 | 20 | 20 | 20 | 20 |
| TBHP (cm³) | ( ) 1% | 10 | 10 | 10 | 10 | 10 | 10 | 10 | 10 | 10 |
|  | [ ] | 0.1 | 0.1 | 0.1 | 0.1 | 0.1 | 0.1 | 0.1 | 0.1 | 0.1 |
| CUPFERRON (cm³) | ( ) 1% | 2 | 2 | 2 | 2 | 2 | 2 | 2 | 2 | 2 |
|  | [ ] | 0.02 | 0.02 | 0.02 | 0.02 | 0.02 | 0.02 | 0.02 | 0.02 | 0.02 |
| EDTA + (cm³) DTPA ++ (cm³) | ( ) 1% | +10 | +30 |  | ++5 | ++10 | ++20 | ++30 |  |  |
|  | ( ) 10% |  |  | +5 |  |  |  |  | ++5 | ++10 |
|  | [ ] | +0.1 | +0.3 | +0.5 | ++0.05 | ++0.1 | ++0.2 | ++0.3 | ++0.5 | ++1 |
| water (cm³) |  | 28 | 8 | 33 | 33 | 28 | 18 | 8 | 33 | 28 |
| setting time at 85° C. |  | 1650 | 1800 | 1900 | 1580 | 1680 | 2100 | 2300 | 2960 | 3010 |

TABLE 9

|  |  | 54 | 55 | 56 | 57 | 58 | 59 |
|---|---|---|---|---|---|---|---|
| BT (cm³) | ( ) 40% | 50 | 50 | 50 | 50 | 50 | 50 |
|  | [ ] | 20 | 20 | 20 | 20 | 20 | 20 |
| TBHP (cm³) | ( ) 1% | 10 | 10 | 10 | 10 | 10 | 10 |
|  | [ ] | 0.1 | 0.1 | 0.1 | 0.1 | 0.1 | 0.1 |
| CUPFERRON (cm³) | ( ) 1% | 2 | 2 | 2 | 2 | 2 | 2 |
|  | [ ] | 0.02 | 0.02 | 0.02 | 0.02 | 0.02 | 0.02 |
| EDTA (cm³) | ( ) 1% | 5 | 10 | 20 | 30 |  |  |
|  | ( ) 10% |  |  |  |  | 5 | 10 |
|  | [ ] | 0.05 | 0.1 | 0.2 | 0.3 | 0.5 | 1 |
| water (cm³) |  | 33 | 28 | 18 | 8 | 33 | 28 |
| setting time at 85° C. |  | 950 | 1250 | 1340 | 1580 | 1820 | 2900 |

We claim:

1. A process for delaying the gelling of unsaturated monomers capable of forming hydrogels in an aqueous medium comprising the steps of:
   a) adding to the aqueous medium a polymerization initiator which is water soluble or water dispersible organic peroxide, whose half-life is at least 10 hours at 60° C.; and then
   b) introducing into said aqueous medium a polymerization inhibitor, in an amount equal to or greater than 0.01% by volume, consisting of an alkali metal or ammonium salt of N-nitrosophenylhydroxylamine or one of its derivatives of Formula I

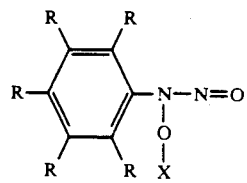

wherein at least two of the radicals R denote hydrogen, the other radicals R being similar or different denote methyl, methoxy, ethoxy, nitro, amino, hydroxyl or chloro groups, and X is an ammonium group or an alkali metal, said salt being used in combination with an aminocarboxylic acid in acidic or basic form in an amount equal to or greater than 0.01% by volume, and wherein said unsaturated monomers are acrylic monomers of water soluble or water-dispersible acrylic or methyacrylic acid, acrylamide, N-alkylacrylamides containing a C1–C4 alkyl radical, methylolacrylamide, methylolmethacrylamide, C1–C4 alkyl acrylates or inorganic methacrylates.

2. A process according to claim 1, wherein:
said polymerization initiator is employed in amounts from 0.2 to 3% by weight relative to the weight of monomers;
said N-nitrosophenylhydroxylamine salt or one of its derivatives is employed in amounts from 0.03 to 0.8% by volume relative to the volume of monomers; and
said aminocarboxylic acid is employed in amounts from 0.03 to 8% by volume relative to the volume of monomers.

3. A process according to claim 1, wherein:
said polymerization initiator is employed in amounts from 0.5 to 2% by weight relative to the weight of monomers;
said N-nitrosophenylhydroxylamine salt or one of its derivatives is employed in amounts from 0.05 to 0.5% by volume relative to the volume of monomers; and
said aminocarboxylic acid is employed in amounts from 0.05 to 5% by volume relative to the volume of monomers.

4. A process according to claim 1, wherein said unsaturated monomers capable of forming a hydrogel are acrylic monomers.

5. A process according to claim 1, wherein said polymerization initiator is selected from the group consisting of tert-butyl hydroperoxide, tert-amyl hydroperoxide and cumene hydroperoxide.

6. A process according to claim 1, wherein said polymerization inhibitor is the ammonium salt of N-nitrosophenylhydroxylamine in combination with an aminocarboxylic acid in acidic or basic form.

7. A process according to claims 1 or 6, wherein said aminocarboxylic acid is in basic form and is an alkali metal salt of ethylenediaminotetracetic acid or of diethylenetriamino-pentacetic acid.

8. Delayed-gelling aqueous compositions based on at least one unsaturated monomer capable of forming a hydrogel, a polymerization initiator and a polymerization inhibitor, comprising:

from 1 to 60 parts by volume of said at least one unsaturated monomer capable of forming a hydrogel;
from 0.2 to 3% by weight relative to the weight of monomers of said polymerization initiator consisting of a water-soluble or -dispersible organic peroxide whose half-life is at least 10 hours at 60° C.;
from 0.03 to 0.8% by volume relative to the volume of monomers of said polymerization inhibitor consisting of an alkali metal or ammonium salt of N-nitrosophenylhydroxylamine or one of its derivatives of formula I:

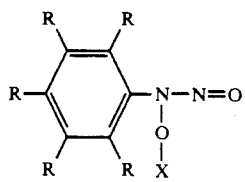

wherein at least two of the radicals R denote hydrogen, the other radicals R being similar or different and denote methyl, methoxy, ethoxy, nitro, amino, hydroxyl or chloro groups and X is an ammonium group or an alkali metal;
from 0.03 to 8% by volume of an aminocarboxylic acid in acidic or basic form, relative to the weight of monomers; and
the complement to make up 100 parts by volume of water.

9. A composition according to claim 8, wherein:
said at least one unsaturated monomer capable of forming a hydrogel is present in amounts from 10 to 30 parts by volume;
said polymerization initiator is present in amounts from 0.5 to 2% by weight relative to the weight of said monomer;
said alkali metal or ammonium salt of N-nitrosophenylhydroxylamine or of one of its derivatives of formula I is present in amounts from 0.05 to 0.5% by volume relative to the weight of monomers;
said aminocarboxylic acid in acidic or basic form is present in amounts from 0.05 to 5% by volume relative to the weight of monomers; and
the complement is present in amounts to make up 100 parts by volume of water.

10. A composition according to claim 8, wherein said unsaturated monomers capable of forming a hydrogel are acrylic monomers.

11. A composition according to claim 8 wherein said polymerization initiator is tertbutyl hydroperoxide, tert-amyl hydroperoxide or cumene hydroperoxide.

12. A composition according to claim 8 wherein said polymerization inhibitor is the ammonium salt of N-nitrosophenylhydroxylamine in combination with said aminocarboxylic acid in acidic or basic form.

13. A composition according to claims 8 or 12 wherein said aminocarboxylic acid is in basic form and is an alkali metal salt of ethylenediaminotetracetic acid or of diethylenetriaminopentacetic acid.

14. The process according to claim 1, wherein the polymerization inhibitor is contained in an amount from 0.1% to 0.8% by volume and the aminocarboxylic acid is contained in an amount from 0.01% to 8%.

* * * * *

UNITED STATES PATENT AND TRADEMARK OFFICE
CERTIFICATE OF CORRECTION

PATENT NO. : 5,043,468

DATED : August 27, 1991

INVENTOR(S) : Robert Maurer et al.

It is certified that error appears in the above-identified patent and that said Letters Patent is hereby corrected as shown below:

Claim 1, column 9, line 20, change "methyacrylic" to --methacrylic--.

Claim 7, column 9, line 62, change "thylenetriamino-pentacetic" to --thylenetriaminopentacetic--.

Claim 14, column 10, line 64, change "0.1" to --0.01--.

Front Page, Assignee, after "Courbevoie" insert --Cedex--.

Signed and Sealed this

Twenty-seventh Day of April, 1993

*Attest:*

MICHAEL K. KIRK

*Attesting Officer*   Acting Commissioner of Patents and Trademarks